(12) United States Patent
Callari

(10) Patent No.: US 12,147,496 B1
(45) Date of Patent: Nov. 19, 2024

(54) AUTOMATIC GENERATION OF TRAINING DATA FOR INSTANCE SEGMENTATION ALGORITHMS

(71) Applicant: Amazon Technologies, Inc., Seattle, WA (US)

(72) Inventor: Francesco Giuseppe Callari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 17/518,012

(22) Filed: Nov. 3, 2021

(51) Int. Cl.
*G06T 7/70* (2017.01)
*G06F 18/214* (2023.01)
*G06T 19/20* (2011.01)

(52) U.S. Cl.
CPC ............ *G06F 18/2148* (2023.01); *G06T 7/70* (2017.01); *G06T 19/20* (2013.01); *G06T 2219/2004* (2013.01)

(58) Field of Classification Search
CPC ....... G06F 18/2148; G06T 7/70; G06T 19/20; G06T 2219/2004
See application file for complete search history.

(56) References Cited

U.S. PATENT DOCUMENTS

| | | | |
|---|---|---|---|
| 10,510,158 B1 * | 12/2019 | Kamon | G06T 7/73 |
| 2017/0085863 A1 * | 3/2017 | Lopez | H04N 13/261 |
| 2017/0243399 A1 * | 8/2017 | Troy | G06T 19/003 |
| 2017/0294135 A1 * | 10/2017 | Lechner | G06T 19/006 |
| 2019/0147221 A1 * | 5/2019 | Grabner | G06T 7/75 382/103 |
| 2020/0050893 A1 * | 2/2020 | Suresh | G06T 11/40 |
| 2021/0019928 A1 * | 1/2021 | Borer | G06N 3/04 |
| 2021/0118310 A1 * | 4/2021 | Kohashi | G08G 5/0026 |

OTHER PUBLICATIONS

Y. Xiang, R. Mottaghi, and S. Savarese, "Beyond Pascal: A Benchmark for 3D Object Detection in the Wild," 2014 In Proceedings of the IEEE Winter Conference on Applications of Computer Vision, pp. 75-82. (Year: 2014).*
"Machine Learning" definition by Wikipedia, accessed May 4, 2024 (Year: 2024).*
"Machine Learning" definition by IBM, accessed May 4, 2024. (Year: 2024).*

* cited by examiner

*Primary Examiner* — Aaron W Carter
*Assistant Examiner* — Kathleen M Broughton
(74) *Attorney, Agent, or Firm* — Athorus, PLLC

(57) ABSTRACT

Systems and methods to automatically generate training data for machine learning models may include an imaging device to capture imaging data, an image processing or rendering system to receive the imaging data and render a three-dimensional model of an object of interest overlaying the imaging data, an automatic mask extraction or generation system to extract or determine a mask, label, or annotation associated with the three-dimensional model and a plurality of pixels associated with the object of interest from a perspective of the imaging device, and a machine learning model to receive the imaging data and the mask as training data.

16 Claims, 10 Drawing Sheets

AUTOMATIC GENERATION OF TRAINING DATA FOR INSTANCE SEGMENTATION ALGORITHMS

BACKGROUND

Various machine learning models, such as neural networks, deep learning models, or other machine learning algorithms, may be used for various computer vision applications. Such machine learning models may be trained for various detection, recognition, classification, or other tasks using labeled or annotated imaging data. However, the labeled imaging data used to train machine learning models may generally be created or annotated using expensive and time-consuming manual processes. Accordingly, there is a need for systems to generate annotated training data for machine learning models using substantially automated, efficient, and cost-effective methods, without sacrificing accuracy and reliability of the trained machine learning models.

DETAILED DESCRIPTION

Figure 1A:
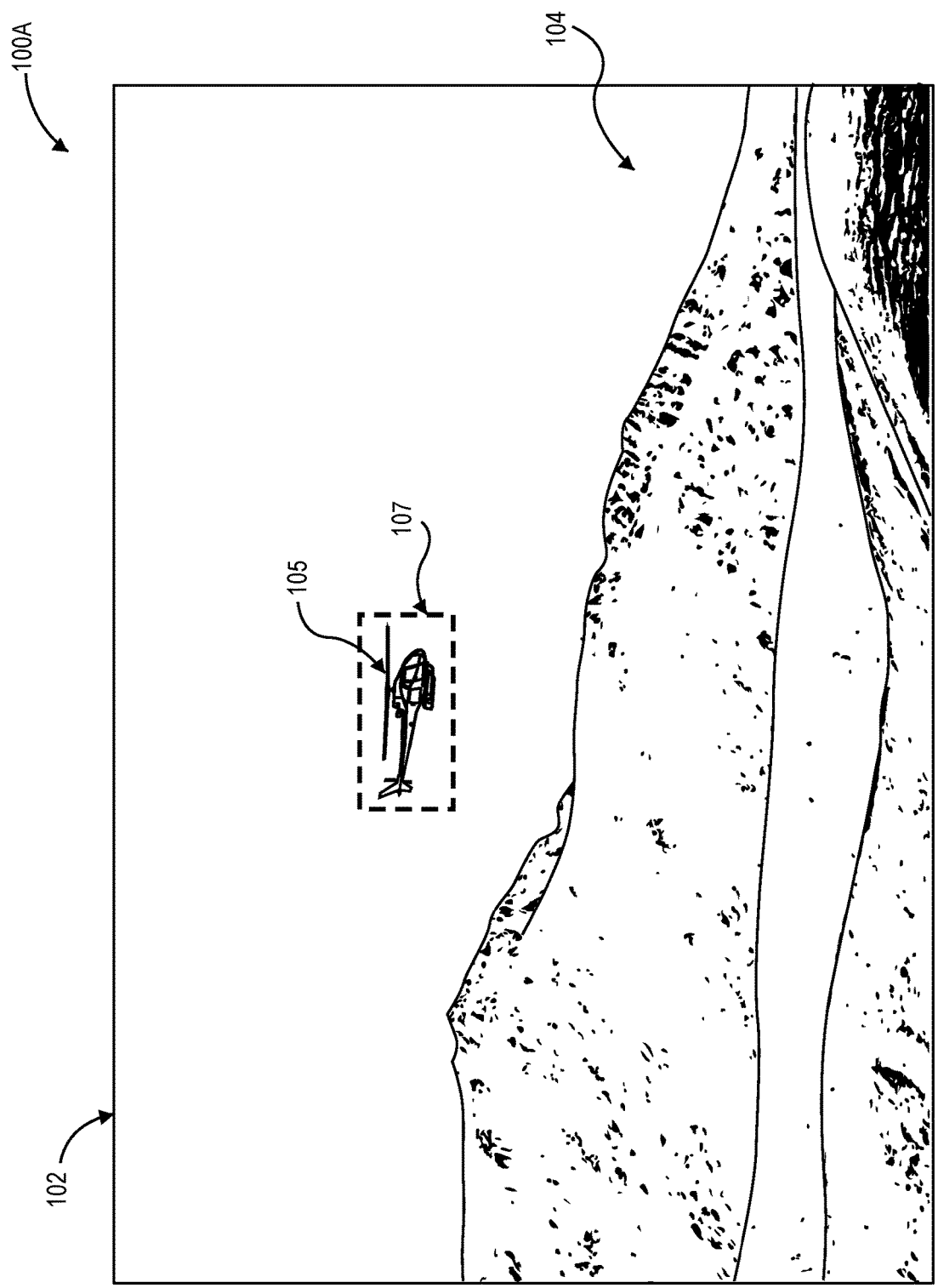
FIG. 1A is a schematic diagram of imaging data including an object of interest, in accordance with implementations of the present disclosure.

As is set forth in greater detail below, implementations of the present disclosure are directed to systems and methods to generate annotated training data for machine learning models in a substantially automated, efficient, and cost-effective manner.

In some example embodiments, imaging data may be supplemented with a synthetic object to simulate a real-world object. The imaging data may be captured by an imaging device at a known position and orientation. A three-dimensional model of the synthetic object may be rendered and overlaid on the imaging data at a simulated position and orientation relative to the position and orientation of the imaging device. Then, a mask or silhouette of the synthetic object that has been rendered and overlaid on the imaging data may be extracted or generated. The imaging data and the mask or silhouette, including one or more pixels within the mask associated with the synthetic object, may then be provided to a machine learning model as training data.

In other example embodiments, imaging data may be captured that includes a representation of a real-world object. The imaging data may be captured by an imaging device at a known position and orientation. A position and orientation, as well as a type or other attribute data, associated with the object may be received or obtained. Then, a three-dimensional model of the object may be rendered and overlaid on the imaging data at the received or known position and orientation relative to the position and orientation of the imaging device. Then, a mask or silhouette of the three-dimensional model of the object that has been rendered and overlaid on the imaging data may be extracted or generated. The imaging data and the mask or silhouette, including one or more pixels within the mask associated with the real-world object, may then be provided to a machine learning model as training data.

Various image rendering algorithms, computer graphics applications, or other related visual data processing and rendering algorithms or techniques may be used to render and overlay three-dimensional models of synthetic or real-world objects onto imaging data. Based on such rendering and overlay of three-dimensional models of objects onto imaging data, masks or silhouettes associated with the three-dimensional models may be extracted or generated from the perspective, or position and orientation, of the imaging device. As a result, portions of imaging data associated with synthetic or real-world objects, e.g., one or more pixels associated with the objects, may be detected, identified, labeled, or annotated substantially automatically.

Further, the imaging data and the labeled or annotated training data may be provided to various machine learning models, e.g., deep learning models, neural networks, or other types of machine learning algorithms or techniques, for various purposes or tasks. For example, the machine learning models may comprise instance segmentation algorithms that may be trained to detect, identify, classify, or recognize one or more objects of interest within imaging data. In example embodiments, the instance segmentation algorithms may detect or identify one or more pixels associated with objects of interest over time, e.g., over multiple frames of imaging data.

Based on the detection or identification of pixels associated with objects of interest over time, various characteristics or attributes associated with objects of interest may be determined or calculated. For example, for airborne objects of interest or other moving objects, times to closest points of approach may be determined or calculated based on the detection of pixels associated with objects of interest over time, which determinations may be used to avoid or prevent collisions or interferences. Generally, determinations of times to closest points of approach may depend substantially only on velocities or rates at which visible areas of objects change or expand, even in the absence of data or information about ranges or distances to such objects.

Using the systems and methods described herein, training data for various machine learning models, e.g., including instance segmentation algorithms or other algorithms or techniques, may be generated substantially automatically and efficiently. In addition, machine learning models that have been trained using such automatically generated training data may perform various tasks, e.g., detection, identification, classification, recognition, or other tasks, with similar accuracy and reliability as machine learning models that have been trained using conventional, time-consuming, manually annotated training data. Accordingly, the systems and methods described herein may facilitate faster and more efficient training of machine learning models to perform various tasks, without sacrificing accuracy and reliability of such machine learning models.

FIG. 1A is a schematic diagram 100A of imaging data including an object of interest, in accordance with implementations of the present disclosure.

As shown in FIG. 1A, example imaging data 102, e.g., comprising multiple frames of imaging data, may be captured by an imaging device and may include representations of an environment or background 104 and/or one or more objects of interest 105. For example, the environment 104 may comprise natural landforms, waterways, structures, or objects, e.g., mountains as shown in FIG. 1A, and/or manmade buildings, roadways, structures, or objects. In addition, the objects of interest 105 may comprise vehicles, e.g., airborne vehicles, ground-based vehicles, water-based vehicles, or other types of vehicles, people, animals, other types of moving objects, or static objects, whether natural or manmade.

The imaging device to capture the example imaging data 102 may comprise any type of imaging device, camera, or sensor, such as an RGB camera, stereo 3D camera, depth sensor, or other types of imaging sensors or devices. In some example embodiments, the imaging device may be positioned at a fixed or static location, such that a position and orientation of the imaging device is determined or known. In other example embodiments, the imaging device may be movable, e.g., coupled to a vehicle such as an unmanned aerial vehicle (UAV), and a position and orientation of the imaging device may be determined based on one or more position and/or orientation sensors associated with the vehicle, e.g., an inertial measurement unit, accelerometer, gyroscope, global positioning system (GPS) sensors, or other related position and/or orientation sensors.

Various object detection, identification, classification, or recognition algorithms may be used to process the imaging data 102 and identify an object of interest 105, e.g., a helicopter, within the imaging data 102. For example, as shown in FIG. 1A, upon detecting the object of interest 105, a tracking or bounding box 107 may be rendered or overlaid around the object of interest 105 and on top of the imaging data 102, and the object of interest 105 may be tracked over multiple frames of the imaging data 102 using various object tracking algorithms or techniques.

Figure 1B:
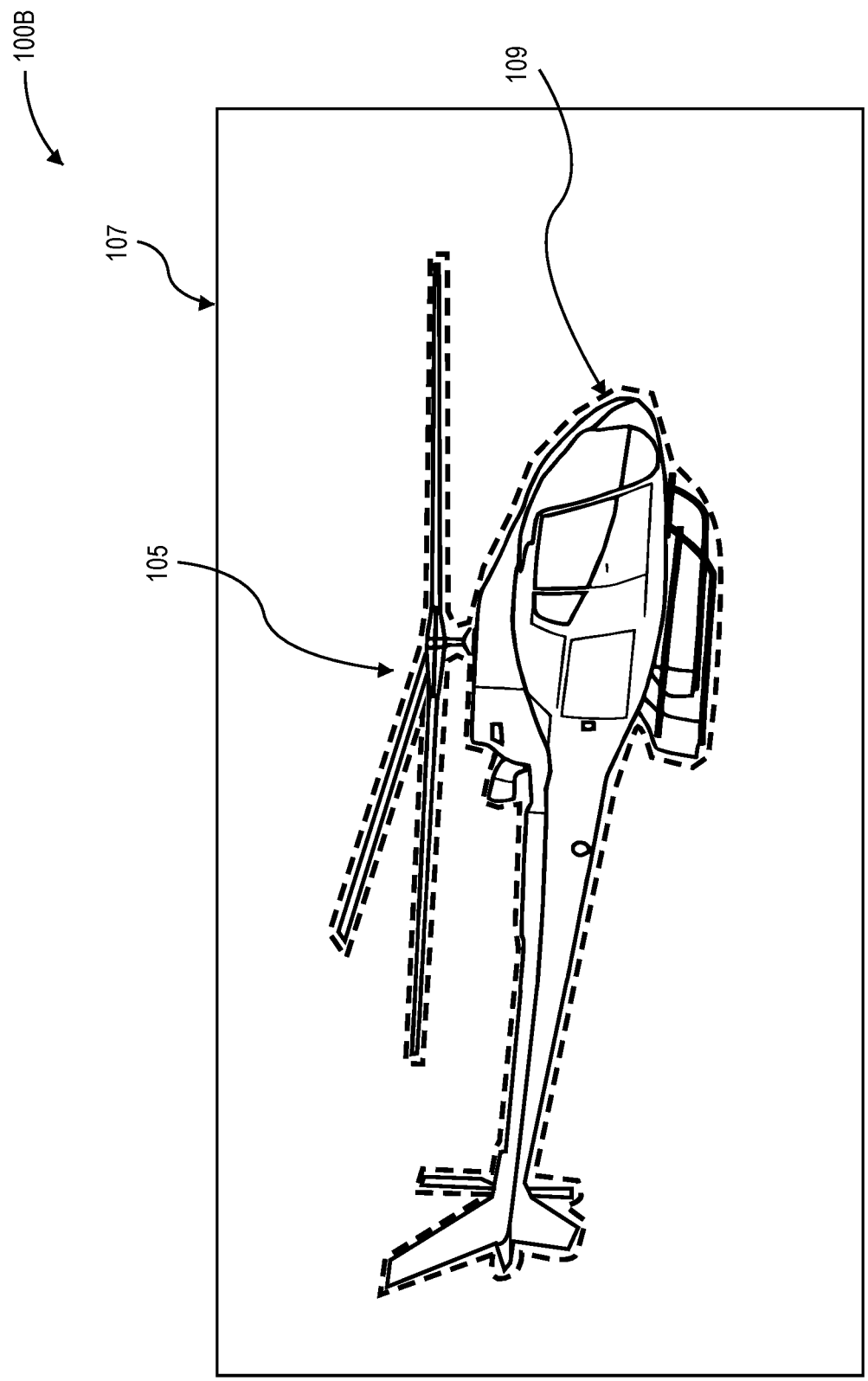
FIG. 1B is a schematic diagram of a portion of the imaging data of FIG. 1A including the manually labeled object of interest, in accordance with implementations of the present disclosure.

FIG. 1B is a schematic diagram 100B of a portion of the imaging data of FIG. 1A including the manually labeled object of interest, in accordance with implementations of the present disclosure.

As shown in FIG. 1B, in order to generate training data for one or more machine learning models, e.g., to perform instance segmentation with respect to objects of interest, the object of interest 105 represented within the imaging data 102 may be labeled or annotated using conventional, manual methods.

Generally, such conventional labeling or annotation techniques may be referred to as rotoscoping. During rotoscoping, a human agent or associate may identify or indicate a boundary or periphery 109 associated with the object of interest 105. The boundary 109 may generally comprise a closed shape that substantially completely surrounds all portions of the object of interest 105, e.g., one or more pixels of the imaging data 102 that are associated with the object of interest 105. Further, for moving objects and/or moving fields of view of an imaging device, the human agent or associate may generally identify or indicate a boundary 109 associated with an object of interest 105 for each frame of multiple frames of the imaging data 102. Moreover, the identification of objects of interest may be checked or reviewed for accuracy and completeness by one or more additional human agents or associates.

Thus, although conventional labeling or annotation techniques, such as rotoscoping, may result in accurate and reliable detection or identification of objects of interest within imaging data, such manual processes may be very time-consuming, expensive, and slow. Nonetheless, in supervised machine learning methods, the imaging data and such manually labeled or annotated objects of interest within imaging data may be provided to one or more machine learning models as training data to facilitate performance of various processes or tasks, including detection, identification, classification, recognition, tracking, instance segmentation, determination of potential collisions or interferences, or other processes or tasks.

In order to overcome the expensive, time-consuming, and inefficient nature of such supervised machine learning methods that utilize manually annotated training data, the systems and methods described herein may facilitate semi-supervised, or unsupervised, machine learning methods in which training data may be labeled or annotated substantially automatically in a faster, more efficient, and cost-effective manner. In some example embodiments, semi-supervised machine learning methods may include various combinations of manually labeled or annotated training data and automatically labeled or annotated training data, as further described herein.

Figure 2A:
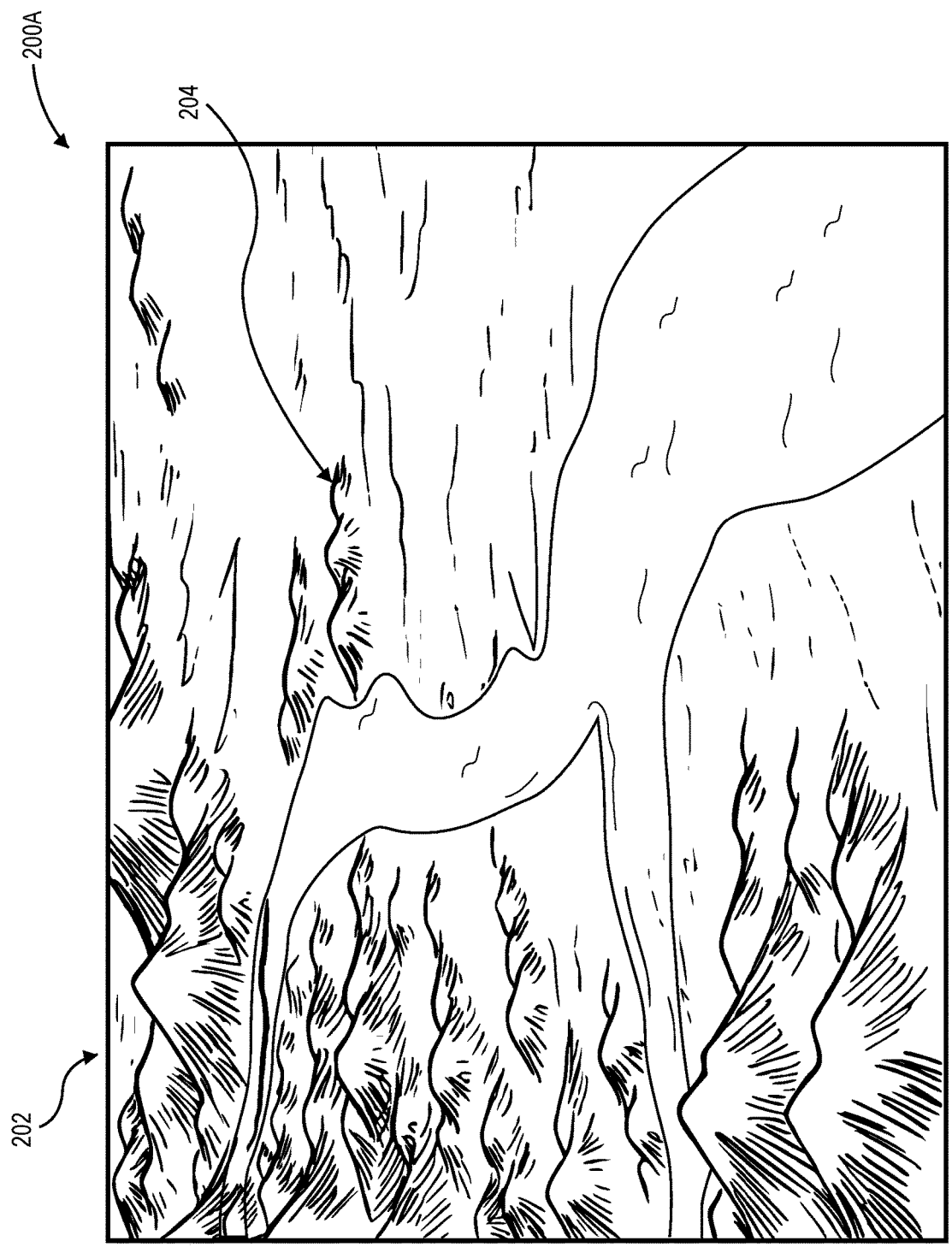
FIG. 2A is a schematic diagram of imaging data, in accordance with implementations of the present disclosure.

FIG. 2A is a schematic diagram 200A of imaging data, in accordance with implementations of the present disclosure.

As shown in FIG. 2A, example imaging data 202, e.g., comprising multiple frames of imaging data, may be captured by an imaging device and may include representations of an environment or background 204. For example, the environment 204 may comprise natural landforms, waterways, structures, or objects, e.g., mountains and rivers as shown in FIG. 2A, and/or manmade buildings, roadways, structures, or objects. In the example of FIG. 2A, the imaging data 202 may not include representations of one or more objects of interest.

The imaging device to capture the example imaging data 202 may comprise any type of imaging device, camera, or sensor, such as an RGB camera, stereo 3D camera, depth sensor, or other types of imaging sensors or devices. In some example embodiments, the imaging device may be positioned at a fixed or static location, such that a position and orientation of the imaging device is determined or known. In other example embodiments, the imaging device may be movable, e.g., coupled to a vehicle such as an unmanned aerial vehicle (UAV), and a position and orientation of the imaging device may be determined based on one or more position and/or orientation sensors associated with the vehicle, e.g., an inertial measurement unit, accelerometer, gyroscope, global positioning system (GPS) sensors, or other related position and/or orientation sensors.

Figure 2B:
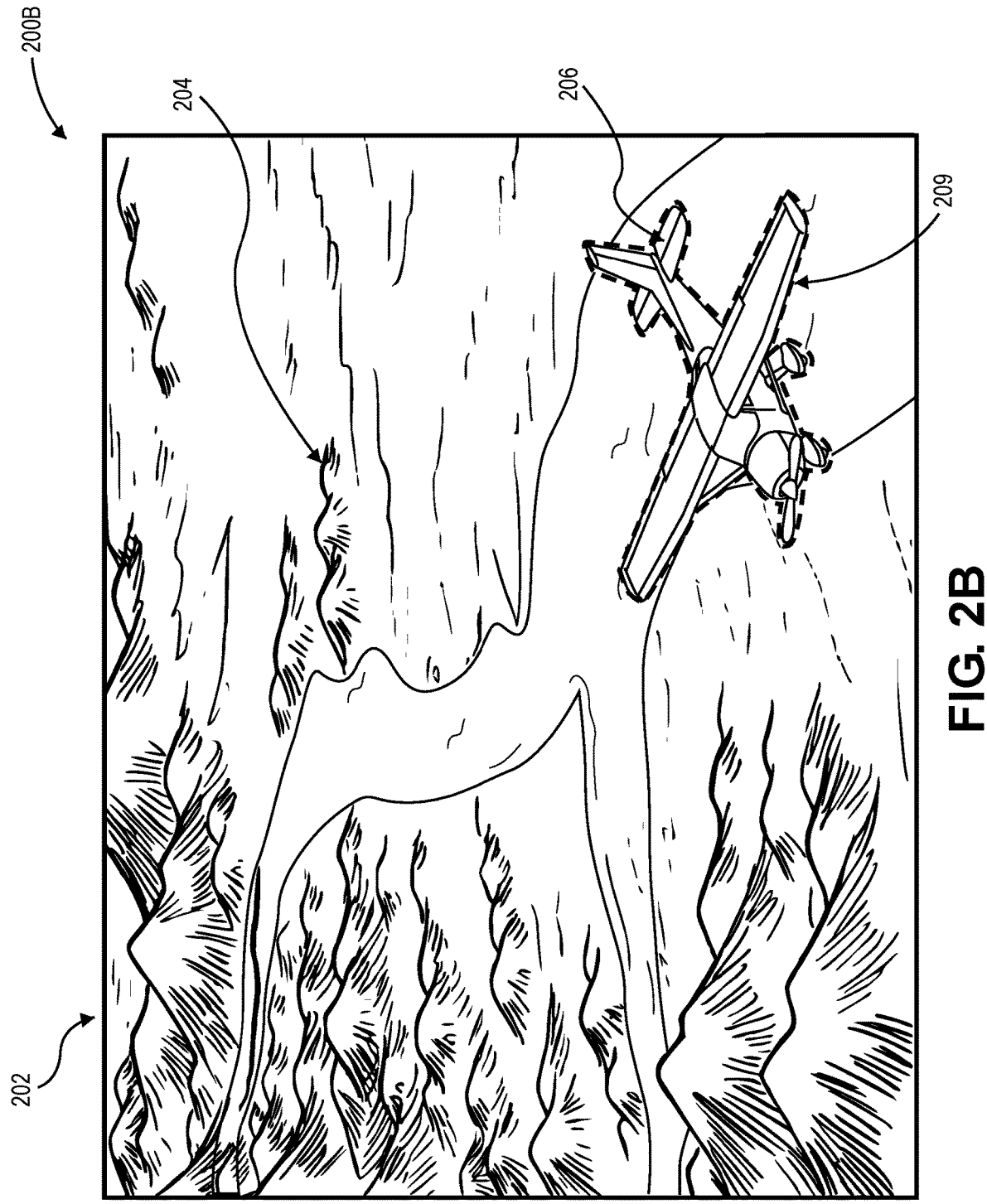
FIG. 2B is a schematic diagram of the imaging data of FIG. 2A including a synthetically generated and automatically labeled object of interest, in accordance with implementations of the present disclosure.

FIG. 2B is a schematic diagram 200B of the imaging data of FIG. 2A including a synthetically generated and automatically labeled object of interest, in accordance with implementations of the present disclosure.

As shown in FIG. 2B, in order to automatically generate training data for one or more machine learning models, e.g., to perform instance segmentation with respect to objects of interest, a three-dimensional model 206 of a synthetic object of interest may be rendered and overlaid on the imaging data 202, and the three-dimensional model 206 of the synthetic object of interest may be labeled or annotated using substantially automated methods described herein.

For example, a type or other attributes associated with a synthetic object of interest may be determined or selected. In the example of FIG. 2B, the type and other attributes of the synthetic object of interest may comprise a single propeller aircraft having a size, shape, features, characteristics, capabilities, and other attributes as schematically shown in FIG. 2B. Then, a three-dimensional model 206 of the synthetic object of interest associated with the type and other attributes may be selected and received, e.g., from a datastore or other repository of three-dimensional models of objects of interest.

In addition, a position and orientation of the three-dimensional model 206 of the synthetic object of interest may be determined or selected. The position and orientation of the three-dimensional model may be determined or selected based on or with reference to a known position and orientation of the imaging device that captured the imaging data 202. In addition, the position and orientation of the three-dimensional model may be determined or selected such that the three-dimensional model is at least partially represented within one or more frames of the imaging data 202, e.g., at least partially within a field of view of the imaging device.

Then, as shown in FIG. 2B, the three-dimensional model 206 of the synthetic object of interest may be rendered and overlaid on the imaging data 202 based on the known position and orientation of the imaging device, as well as the determined position and orientation of the three-dimensional model relative to the imaging device. The three-dimensional model 206 of the synthetic object of interest may have a size, shape, and other visual features that simulate a representation of an actual object associated with the type and other attributes at the selected position and orientation within the imaging data 202, even though no such actual object may be originally represented within the imaging data 202 as captured by the imaging device.

Then, based on the rendering and overlay of the three-dimensional model 206 of the synthetic object of interest at the selected position and orientation within the imaging data 202, a mask or silhouette 209 associated with the synthetic object of interest may be extracted or generated. For example, the mask 209 may comprise a boundary or periphery associated with the three-dimensional model 206 of the synthetic object of interest, as viewed from a perspective, or the position and orientation, of the imaging device. The boundary may generally comprise a closed shape that substantially completely surrounds all portions of the three-dimensional model 206 of the synthetic object of interest, e.g., one or more pixels of the three-dimensional model of the synthetic object of interest.

Further, to simulate movement of a three-dimensional model of a synthetic object of interest relative to the imaging data 202, the three-dimensional model may be rendered and overlaid on multiple frames of the imaging data 202 at different selected positions and orientations that may approximate movement of an actual object within the imaging data 202. Moreover, respective masks 209 may be extracted or generated for each frame including the three-dimensional model 206 of the synthetic object of interest overlaid on the imaging data 202.

Then, the imaging data 202, e.g., including the overlaid three-dimensional model 206 of the synthetic object of interest, and the automatically extracted or generated masks 209 may be provided to one or more machine learning models as training data to facilitate performance of various processes or tasks, including detection, identification, classification, recognition, tracking, instance segmentation, determination of potential collisions or interferences, or other processes or tasks. As a result, the systems and methods described herein may facilitate semi-supervised, or unsupervised, machine learning methods in which training data may be labeled or annotated substantially automatically in a faster, more efficient, and cost-effective manner.

Although FIGS. 2A and 2B illustrate particular examples of environment or background, and particular examples of synthetic objects of interest, other example embodiments may include various other types or examples of environments, backgrounds, or objects of interest. For example, the example environments or backgrounds may include other natural landforms, waterways, structures, or objects, man-made buildings, roadways, structures, or objects, other outdoor or indoor environments, various aerial, ground-based, or water-based environments, or others. Further, the example objects of interest may include other types of vehicles, such as ground-based vehicles, water-based vehicles, or others, people, animals, other types of moving objects, or static objects, whether natural or manmade.

Figure 3:
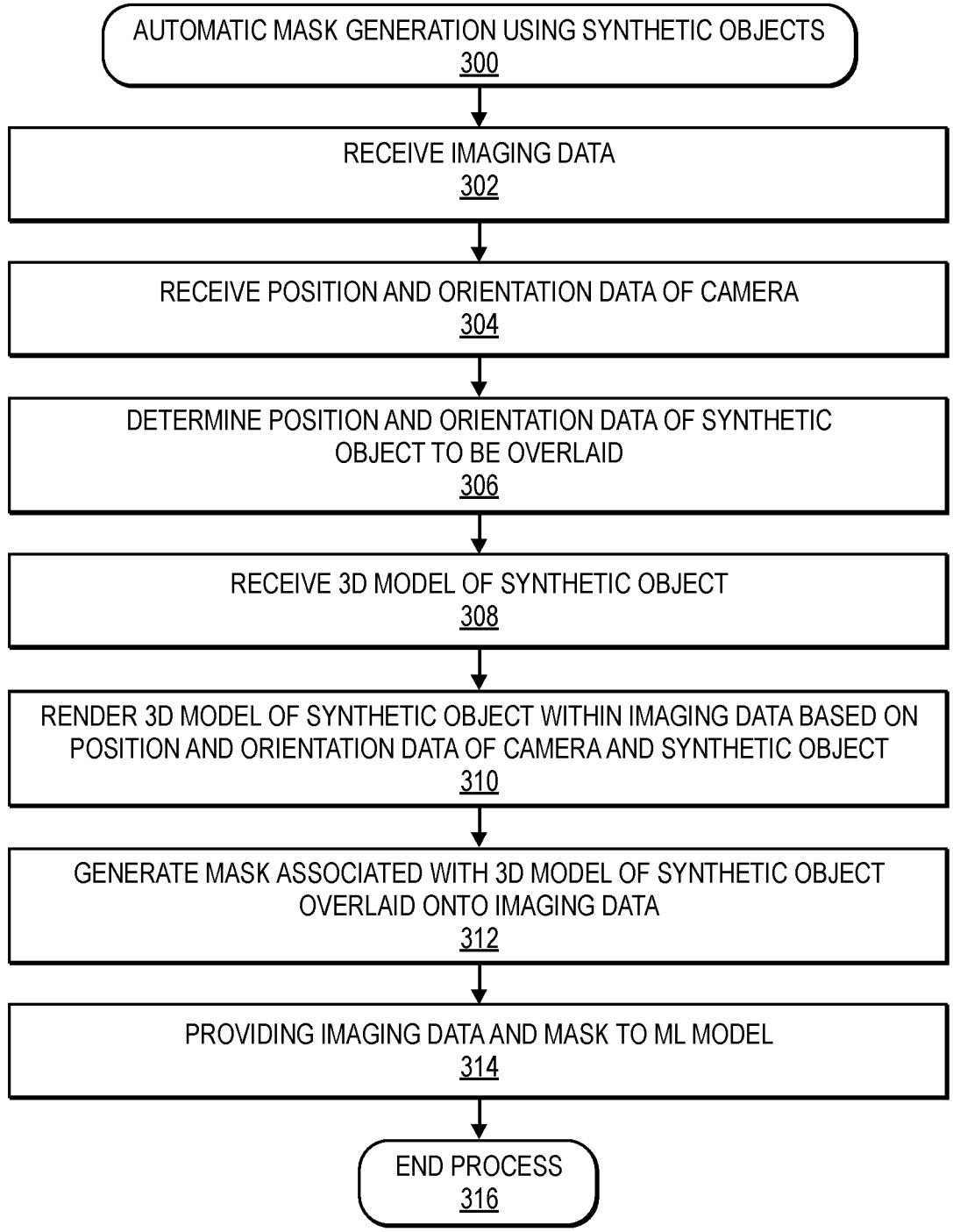
FIG. 3 is a flow diagram illustrating an example automatic mask generation using synthetic objects process, in accordance with implementations of the present disclosure.

FIG. 3 is a flow diagram illustrating an example automatic mask generation using synthetic objects process 300, in accordance with implementations of the present disclosure.

The process 300 may begin by receiving imaging data, as at 302. For example, an imaging device may capture imaging data including representations of an environment. The imaging device may be at a fixed or static location, or the imaging device may be movable or coupled to a moving vehicle, such as an unmanned aerial vehicle. Further, a control system and/or a vehicle control system may receive the imaging data.

The process 300 may continue by receiving position and orientation data of the camera, as at 304. For example, for a fixed or static location of an imaging device or camera, a position and/or orientation of the imaging device may be known, e.g., stored in a database or other repository. For a movable or moving location of an imaging device or camera, a position and/or orientation of the imaging device may be determined based on data from one or more position and/or orientation sensors associated with the imaging device, or a vehicle or other moving object to which the imaging device may be coupled. Example position and/or orientation sensors may include inertial measurement units, accelerometers, gyroscopes, global positioning system (GPS) sensors, or other related position and/or orientation sensors. Further, a control system and/or a vehicle control system may receive the position and orientation data of the camera.

The process 300 may proceed by determining position and orientation data of the synthetic object to be overlaid, as at 306. For example, a type and other attributes of a synthetic object to be rendered and overlaid on the imaging data may be received. In addition, a position and orientation at which to render and overlay the synthetic object on the imaging data may be determined or selected. In example embodiments, the position and orientation of the synthetic object may be selected such that at least a portion of the synthetic object may be represented within the field of view of the imaging device, e.g., within at least one frame of the imaging data. Further, a control system and/or a vehicle control system may determine the position and orientation data of the synthetic object.

The process 300 may then continue to receive a three-dimensional model of the synthetic object, as at 308. For example, based at least on the type and other attributes of the synthetic object to be rendered and overlaid on the imaging data, a three-dimensional model of the synthetic object may be received, e.g., from a datastore or other repository of three-dimensional models of objects of interest. Further, a control system and/or a vehicle control system may receive the three-dimensional model of the synthetic object.

The process 300 may proceed to render the three-dimensional model of the synthetic object within imaging data based on the position and orientation data of the camera and synthetic object, as at 310. For example, the three-dimensional model may be positioned and oriented, e.g., rotated in various directions, based on the selected position and orientation data of the synthetic object, as well as the position and orientation data of the imaging device. In addition, the three-dimensional model may be positioned or overlaid on the imaging data based on the relative position and orientation data of the imaging device and the synthetic object. Furthermore, the three-dimensional model may be rendered with a size, shape, and/or other visual features based on the relative position and orientation data of the imaging device and the synthetic object, e.g., to simulate an actual object represented within the imaging data at the selected position and orientation. Further, a control system and/or a vehicle control system may render the three-dimensional model of the synthetic object within imaging data.

The process 300 may then continue with generating a mask associated with the three-dimensional model of the synthetic object overlaid onto the imaging data, as at 312. For example, a mask or silhouette associated with the three-dimensional model of the synthetic object may be extracted or generated from the imaging data. The mask or silhouette may comprise a boundary, periphery, outline, curve, edge, surface, area, or other indication including, enclosing, encompassing, or otherwise indicating one or more pixels associated with the three-dimensional model of the synthetic object. As a result, the mask or silhouette may comprise a label or annotation associated with the three-dimensional model of the synthetic object that may be used as training data for one or more machine learning models. Further, a control system and/or a vehicle control system may generate a mask associated with the three-dimensional model of the synthetic object overlaid onto the imaging data.

The process 300 may then proceed with providing the imaging data and the mask to a machine learning model, as at 314. For example, the imaging data may be provided as training inputs to one or more machine learning models, and the mask or silhouette indicating one or more pixels of the three-dimensional model of the synthetic object may be provided as training outputs to one or more machine learning models. Thus, the automatically generated masks or silhouettes may be utilized as training data for one or more machine learning models to facilitate performance of various processes or tasks, e.g., detection, identification, classification, recognition, tracking, instance segmentation, determination of potential collisions or interferences, or other processes or tasks. Further, a control system and/or a vehicle control system may provide the imaging data and the masks as training data to one or more machine learning models.

The process 300 may then end, as at 316.

Using the systems and methods described herein, training data including masks, labels, or annotations associated with three-dimensional models of synthetic objects of interest may be automatically extracted or generated to facilitate semi-supervised, or unsupervised, machine learning methods in a faster, more efficient, and cost-effective manner. Further, the trained machine learning models may then facilitate performance of various processes or tasks, including detection, identification, classification, recognition, tracking, instance segmentation, determination of potential collisions or interferences, or other processes or tasks.

Rendering and overlaying three-dimensional models of synthetic objects of interest on imaging data may include some potential limitations or drawbacks, however. For example, masks and associated pixels of three-dimensional models may have color, lighting, shadow, or other visual effects that may not accurately represent or correspond to such visual effects associated with actual objects present within the environments captured in the imaging data. Additional visual effects that may not be accurately modeled or represented by three-dimensional models of synthetic objects of interest may also include reflections, refractions, shadows, specularities, or various other visual effects. In addition, masks and associated pixels of three-dimensional models may have visual characteristics that may not accurately represent or correspond to environmental effects, such as haze, fog, rain, snow, wind, or other environmental or weather effects, on such visual characteristics associated with actual objects present within the environments captured in the imaging data. Moreover, masks and associated pixels of three-dimensional models may have visual characteristics that may not accurately represent or correspond to image capture characteristics, such as focal length, field of view, exposure, resolution, or other image capture characteristics, associated with other portions of the imaging data.

In order to resolve one or more of these potential limitations or drawbacks of overlaying three-dimensional models of synthetic objects of interest on imaging data to generate training data for machine learning models, actual or real-world objects of interest may be captured and represented within imaging data. Then, masks and associated pixels of the real-world objects represented within imaging data may be substantially automatically extracted or generated as training data for various machine learning models, as further described herein.

Figure 4A:
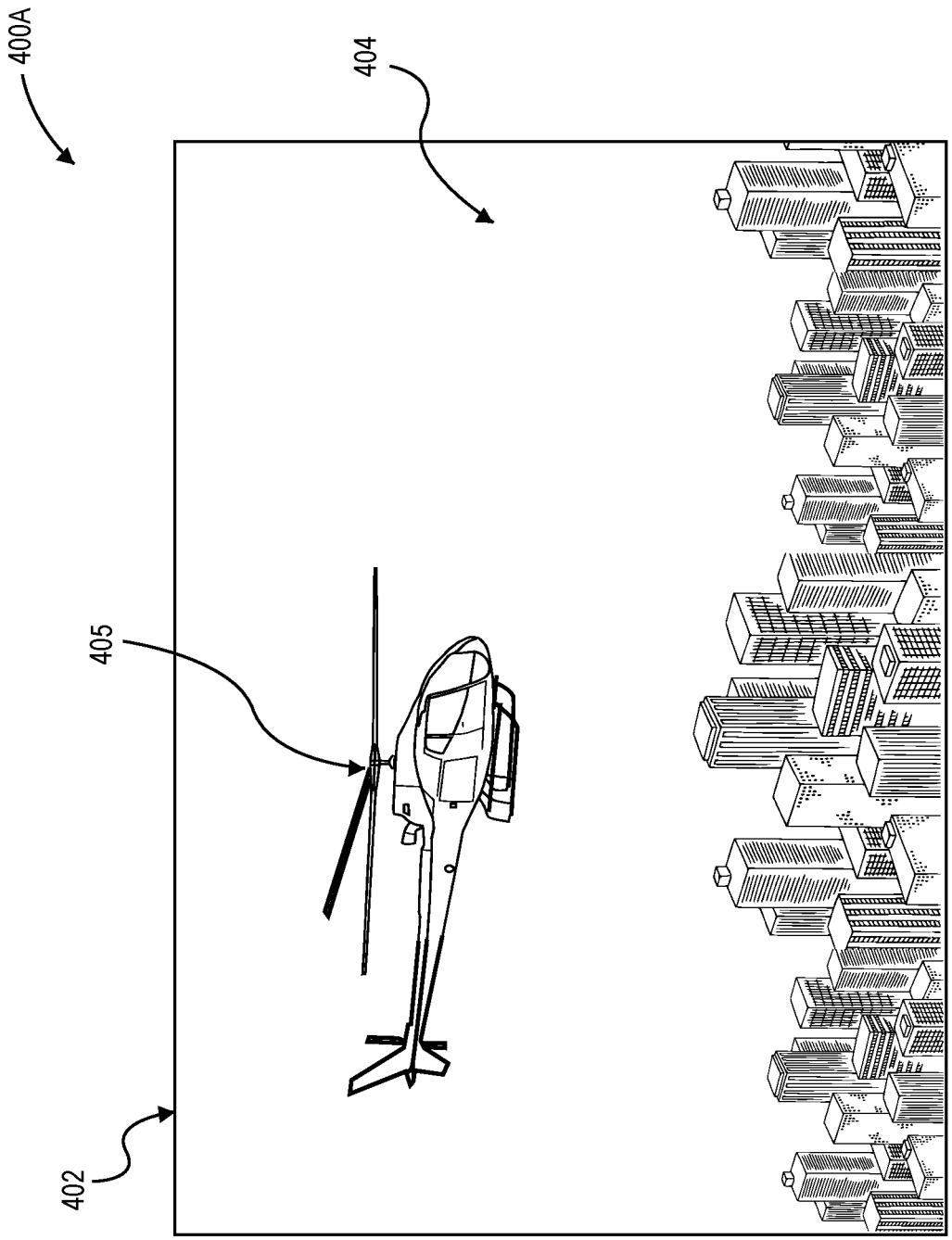
FIG. 4A is a schematic diagram of imaging data including an object of interest, in accordance with implementations of the present disclosure.

FIG. 4A is a schematic diagram 400A of imaging data including an object of interest, in accordance with implementations of the present disclosure.

As shown in FIG. 4A, example imaging data 402, e.g., comprising multiple frames of imaging data, may be captured by an imaging device and may include representations of an environment or background 404 and/or one or more objects of interest 405. For example, the environment 404 may comprise natural landforms, waterways, structures, or objects, and/or manmade buildings, roadways, structures, or objects, e.g., buildings or structures as shown in FIG. 4A. In addition, the objects of interest 405 may comprise vehicles, e.g., airborne vehicles, ground-based vehicles, water-based vehicles, or other types of vehicles, people, animals, other types of moving objects, or static objects, whether natural or manmade.

The imaging device to capture the example imaging data 402 may comprise any type of imaging device, camera, or sensor, such as an RGB camera, stereo 3D camera, depth sensor, or other types of imaging sensors or devices. In some example embodiments, the imaging device may be positioned at a fixed or static location, such that a position and orientation of the imaging device is determined or known. In other example embodiments, the imaging device may be movable, e.g., coupled to a vehicle such as an unmanned aerial vehicle (UAV), and a position and orientation of the imaging device may be determined based on one or more position and/or orientation sensors associated with the vehicle, e.g., an inertial measurement unit, accelerometer, gyroscope, global positioning system (GPS) sensors, or other related position and/or orientation sensors.

Figure 4B:
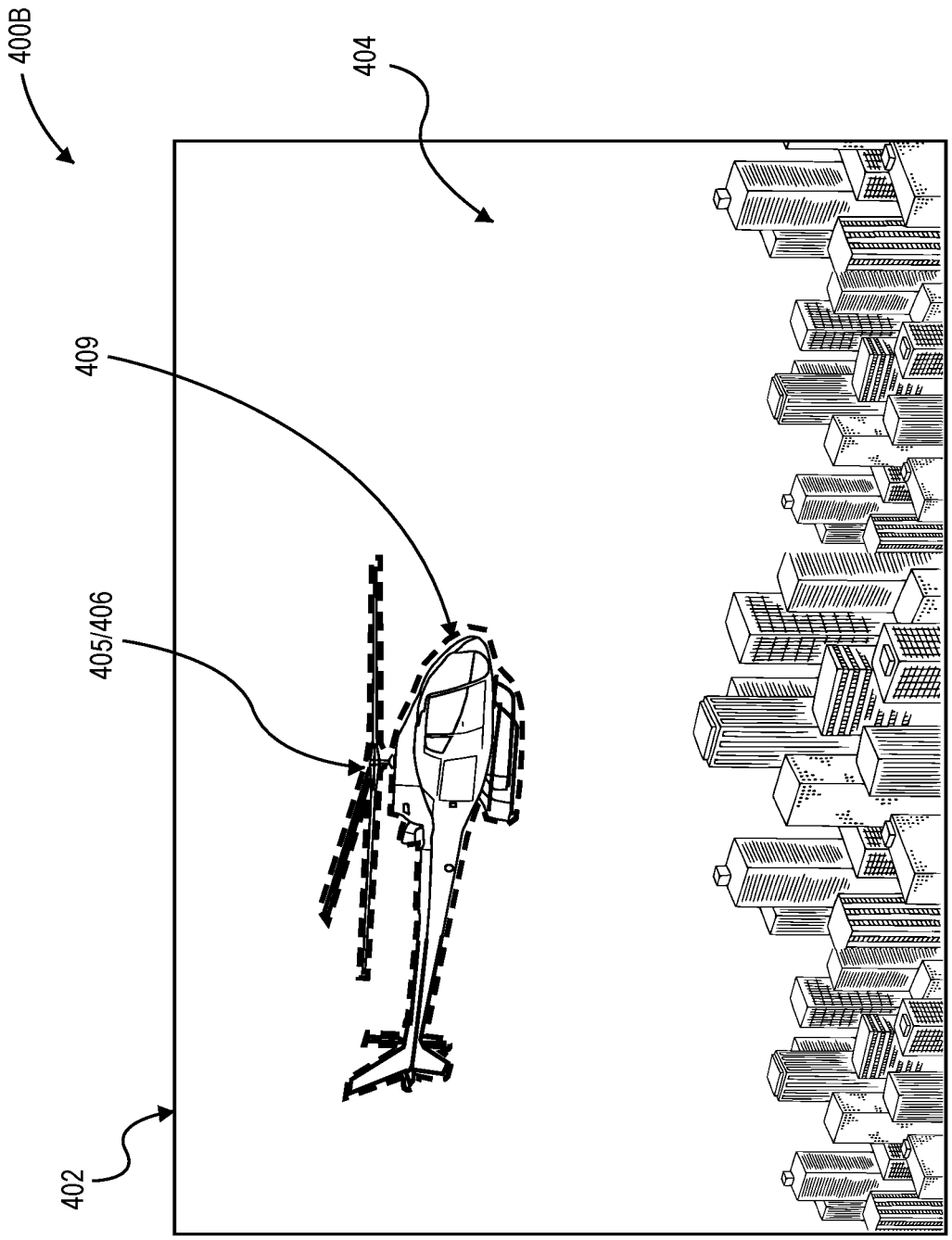
FIG. 4B is a schematic diagram of the imaging data of FIG. 4A including the automatically labeled object of interest, in accordance with implementations of the present disclosure.

FIG. 4B is a schematic diagram 400B of the imaging data of FIG. 4A including the automatically labeled object of interest, in accordance with implementations of the present disclosure.

As shown in FIG. 4B, in order to automatically generate training data for one or more machine learning models, e.g., to perform instance segmentation with respect to objects of interest, a three-dimensional model 406 of the actual or real-world object of interest 405 represented in the imaging data 402 may be rendered and overlaid on the imaging data 402, and the three-dimensional model 406 of the actual object of interest 405 may be labeled or annotated using substantially automated methods described herein.

For example, a type or other attributes associated with the actual object of interest 405 may be determined or received. In some example embodiments, the type and other attributes of the actual object of interest 405 may be selected, known, or predetermined by intentionally generating the imaging data 402 using a selected object of interest 405. In other example embodiments, the type and other attributes of the actual object of interest 405 may be received via a communication, identification, or other data received from the object of interest 405. In further example embodiments, the type and other attributes of the actual object of interest 405 may be determined based on detection, identification, classification, or recognition of the actual object of interest 405 using various image recognition techniques or algorithms.

In the example of FIG. 4B, the type and other attributes of the actual object of interest 405 may comprise a helicopter having a size, shape, features, characteristics, capabilities, and other attributes as schematically shown in FIG. 4B. Then, a three-dimensional model 406 of the actual object of interest 405 associated with the type and other attributes may be selected and received, e.g., from a datastore or other repository of three-dimensional models of objects of interest.

In addition, a position and orientation of the three-dimensional model 406 of the actual object of interest 405 may be determined or received. In some example embodiments, the position and orientation of the actual object of interest 405 may be received via a communication, identification, or other data received from one or more position and/or orientation sensors associated with the object of interest 405, e.g., an inertial measurement unit, accelerometer, gyroscope, global positioning system (GPS) sensors, or other related position and/or orientation sensors. In further example embodiments, the position and orientation of the actual object of interest 405 may be determined based on detection, identification, classification, or recognition of the position and orientation of the actual object of interest 405 using various image recognition techniques or algorithms.

The position and orientation of the three-dimensional model may be determined or received based on or with reference to a known position and orientation of the imaging device that captured the imaging data 402. In addition, the position and orientation of the three-dimensional model may be determined or received with respect to one or more frames of the imaging data 402 in which the actual object of interest 405 is at least partially represented, e.g., at least partially within a field of view of the imaging device.

Further, the determination of the position and orientation of the actual object of interest 405 may be corrected for various errors, including positioning errors, timing errors, or other errors. For example, position and orientation data from one or more position and/or orientation sensors may include positioning errors, e.g., positioning errors from GPS sensors or other sensors. In addition, the imaging device that captured the imaging data and one or more position and/or orientation sensors associated with the actual object of interest may include timing errors between the data captured by the imaging device and the data received from one or more position and/or orientation sensors. In example embodiments, the various errors may result in incorrect or inaccurate determinations of position and/or orientation of the actual object of interest represented within the imaging data. Furthermore, rendering and overlaying a three-dimensional model of the object of interest based on the incorrect or inaccurate determinations of position and/or orientation of the actual object of interest may result in a three-dimensional model that is rendered and overlaid at an offset, different, or inaccurate position and orientation than the actual position and orientation of the actual object of interest represented within the imaging data.

In order to correct the incorrect or inaccurate determinations of position and/or orientation of the actual object of interest, a coarse label associated with the actual object of interest may be received. For example, a coarse label may comprise a bounding box around an object of interest, indications of topmost, bottommost, leftmost, and rightmost points associated with an object of interest, two or more intersecting line segments that extend to outer extents of an object of interest, a circle having a defined radius or diameter, an ellipse or oval, or other shapes associated with an object of interest, or other indications or annotations associated with an object of interest. Generally, a coarse label may surround, enclose, or encompass substantially all portions of the object of interest.

In example embodiments, a coarse label may be generated by substantially manual labeling or annotation processes. In other example embodiments, a coarse label may be generated by at least partially automated labeling or annotation processes. In still further example embodiments, a coarse label may comprise an output of manual rotoscoping that identifies, includes, or encompasses a plurality of pixels associated with the object of interest. Moreover, one or more coarse labels may be generated for a subset of frames of a plurality of frames of the imaging data, e.g., less than all frames of the imaging data.

By comparing the determinations of position and/or orientation of the actual object of interest with one or more coarse labels associated with the actual object of interest, the determinations of position and/or orientation may be corrected for various positioning, timing, or other errors, such that the corrected determinations of position and/or orientation of the actual object of interest may substantially correspond to or match with an actual position and/or orientation of the object of interest represented within the imaging data.

Then, as shown in FIG. 4B, the three-dimensional model 406 of the actual object of interest 405 may be rendered and overlaid on the imaging data 402 based on the known position and orientation of the imaging device, as well as the determined or received position and orientation of the three-dimensional model relative to the imaging device. The three-dimensional model 406 of the actual object of interest 405 may have a size, shape, and other visual features that simulate the representation of the actual object of interest 405 associated with the type and other attributes at the determined or received position and orientation within the imaging data 402. In addition, the three-dimensional model 406 may be positioned and oriented to substantially match and overlay the position and orientation of the actual object of interest 405 within the imaging data 402 as captured by the imaging device.

Then, based on the rendering and overlay of the three-dimensional model 406 of the actual object of interest 405 at the determined or received position and orientation within the imaging data 402, a mask or silhouette 409 associated with the three-dimensional model 406 and the actual object of interest 405 may be extracted or generated. For example, the mask 409 may comprise a boundary or periphery associated with the three-dimensional model 406 of the actual object of interest 405, as viewed from a perspective, or the position and orientation, of the imaging device. The boundary may generally comprise a closed shape that substantially completely surrounds all portions of the three-dimensional model 406 of the actual object of interest 405, e.g., one or more pixels of the three-dimensional model 406 and the actual object of interest 405.

Further, as the actual object of interest 405 moves within the imaging data 402, the three-dimensional model 406 may be rendered and overlaid on multiple frames of the imaging data 402 at different determined or received positions and orientations that correspond to movement of the actual object of interest 405 within the imaging data 402. Moreover, respective masks 409 may be extracted or generated for each frame including the three-dimensional model 406 of the actual object of interest 405 overlaid on the imaging data 402.

Then, the imaging data 402 including the actual object of interest 405, e.g., which may or may not include the overlaid three-dimensional model 406 of the actual object of interest 405, and the automatically extracted or generated masks 409 may be provided to one or more machine learning models as training data to facilitate performance of various processes or tasks, including detection, identification, classification, recognition, tracking, instance segmentation, determination of potential collisions or interferences, or other processes or tasks. As a result, the systems and methods described herein may facilitate semi-supervised, or unsupervised, machine learning methods in which training data may be labeled or annotated substantially automatically in a faster, more efficient, and cost-effective manner.

By rendering and overlaying three-dimensional models of actual objects of interest on imaging data in order to generate masks or silhouettes associated with the actual objects of interest, the masks or silhouettes may label, annotate, enclose, encompass, or otherwise indicate one or more pixels of the actual object of interest. As a result, the labeled or annotated pixels of the actual object of interest may not suffer from the potential limitations or drawbacks discussed herein with respect to pixels associated with synthetic objects of interest, or three-dimensional models of objects of interest. For example, masks and associated pixels of actual objects may have color, lighting, shadows, reflections, refractions, specularities, or various other visual effects that accurately represent or correspond to such visual effects present within the environments captured in the imaging data. In addition, masks and associated pixels of actual objects may have visual characteristics that accurately represent or correspond to environmental effects, such as haze, fog, rain, snow, wind, or other environmental or weather effects, on such visual characteristics present within the environments captured in the imaging data. Moreover, masks and associated pixels of actual objects may have visual characteristics that accurately represent or correspond to image capture characteristics, such as focal length, field of view, exposure, resolution, or other image capture characteristics, associated with other portions of the imaging data.

In some example embodiments, the position and orientation data received from an actual object of interest may comprise substantially only position data, and the orientation data of the actual object of interest may be determined or estimated based on various other factors. For example, based on an understanding of the force of gravity relative to the position and orientation of the imaging device and the imaging data, based on an estimated or determined direction of motion of an actual object of interest across multiple frames of the imaging data, and/or based on one or more attributes, characteristics, or capabilities of the actual object of interest, the orientation data of the actual object of interest may be determined or estimated. In one example, for an actual object of interest that comprises a jet airliner, the orientation data of the airliner may be estimated based on a direction of motion of the airliner between multiple frames of the imaging data and flight characteristics and/or capabilities of the airliner. Various other types of actual objects of interest may include other flight or movement characteristics and/or capabilities, and the orientation data of such objects of interest may be estimated or inferred based on changes in position data, or directions of motion, across multiple frames of imaging data.

Although FIGS. 4A and 4B illustrate particular examples of environment or background, and particular examples of actual or real-world objects of interest, other example embodiments may include various other types or examples of environments, backgrounds, or objects of interest. For example, the example environments or backgrounds may include other natural landforms, waterways, structures, or objects, manmade buildings, roadways, structures, or objects, other outdoor or indoor environments, various aerial, ground-based, or water-based environments, or others. Further, the example objects of interest may include other types of vehicles, such as ground-based vehicles, water-based vehicles, or others, people, animals, other types of moving objects, or static objects, whether natural or manmade.

Figure 5:
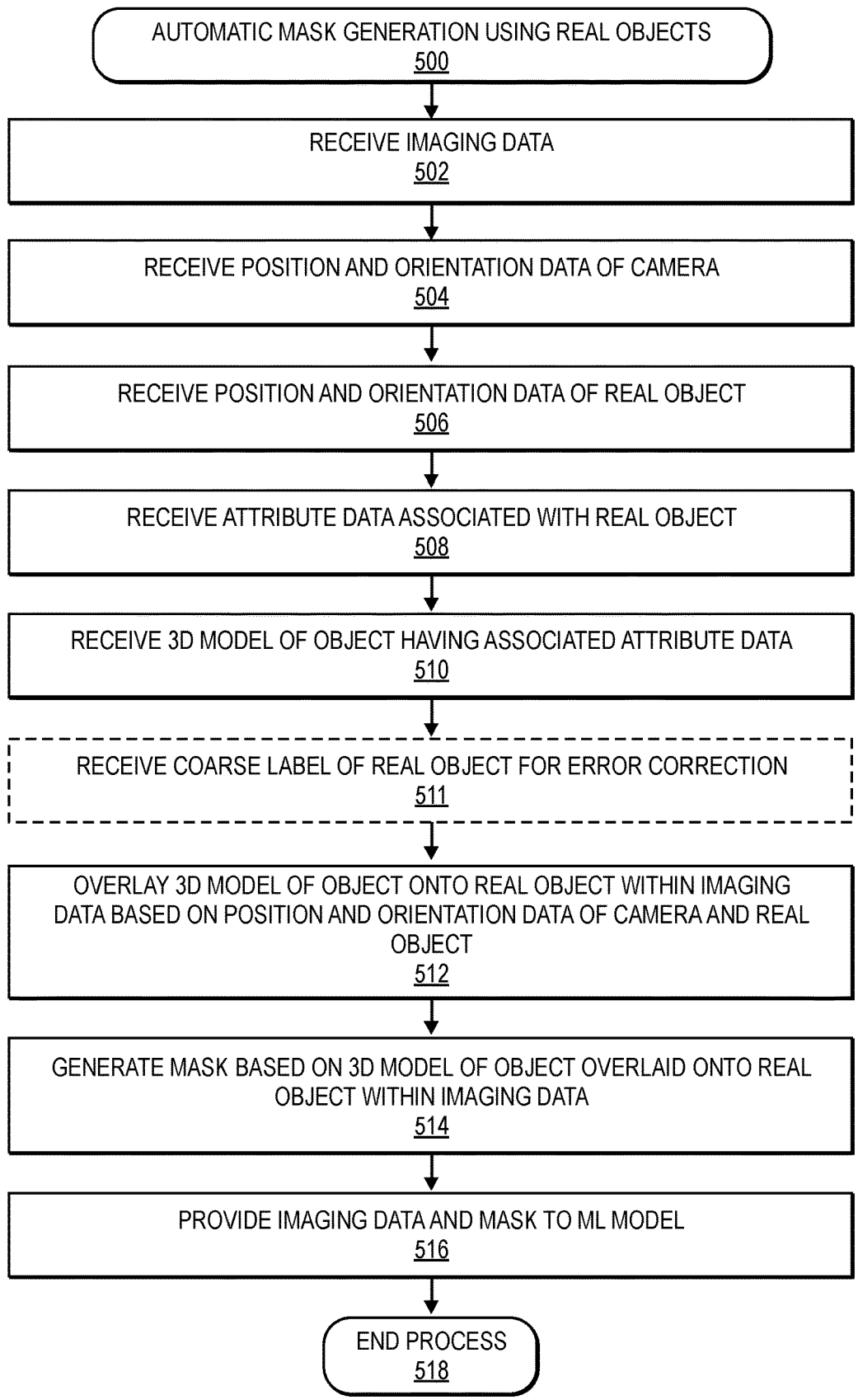
FIG. 5 is a flow diagram illustrating an example automatic mask generation using real objects process, in accordance with implementations of the present disclosure.

FIG. 5 is a flow diagram illustrating an example automatic mask generation using real objects process 500, in accordance with implementations of the present disclosure.

The process 500 may begin by receiving imaging data, as at 502. For example, an imaging device may capture imaging data including representations of an environment. The imaging device may be at a fixed or static location, or the imaging device may be movable or coupled to a moving vehicle, such as an unmanned aerial vehicle. Further, a control system and/or a vehicle control system may receive the imaging data.

The process 500 may continue by receiving position and orientation data of the camera, as at 504. For example, for a fixed or static location of an imaging device or camera, a position and/or orientation of the imaging device may be known, e.g., stored in a database or other repository. For a movable or moving location of an imaging device or camera, a position and/or orientation of the imaging device may be determined based on data from one or more position and/or orientation sensors associated with the imaging device, or a vehicle or other moving object to which the imaging device may be coupled. Example position and/or orientation sensors may include inertial measurement units, accelerometers, gyroscopes, global positioning system (GPS) sensors, or other related position and/or orientation sensors. Further, a control system and/or a vehicle control system may receive the position and orientation data of the camera.

The process 500 may proceed by receiving position and orientation data of a real object, as at 506. For example, a position and orientation of an actual object of interest that is represented within the imaging data may be determined or received. In some example embodiments, a position and/or orientation of the actual object of interest may be determined based on data from one or more position and/or orientation sensors associated with the actual object of interest. Example position and/or orientation sensors may include inertial measurement units, accelerometers, gyroscopes, global positioning system (GPS) sensors, or other related position and/or orientation sensors. Further, a control system and/or a vehicle control system may receive the position and orientation data of the real object.

The process 500 may continue by receiving attribute data associated with the real object, as at 508. For example, a type and other attributes of the actual object of interest that is represented within the imaging may be received. In some example embodiments, the type and other attributes of the actual object of interest may be preselected or predetermined, and the imaging data may be intentionally generated using the selected actual object. Further, a control system and/or a vehicle control system may receive the attribute data of the real object.

The process 500 may then continue to receive a three-dimensional model of the real object, as at 510. For example, based at least on the type and other attributes of the actual object of interest, a three-dimensional model of the actual object may be received, e.g., from a datastore or other repository of three-dimensional models of objects of interest, to be rendered and overlaid on the imaging data. Further, a control system and/or a vehicle control system may receive the three-dimensional model of the real object.

The process 500 may continue by receiving a coarse label of the real object for error correction, as at 511. For example, one or more coarse labels associated with the actual object of interest represented within the imaging data may be generated or received. The coarse labels may comprise bounding boxes, indications of topmost, bottommost, leftmost, and rightmost points associated with the actual object of interest, two or more intersecting lines that indicate outer extents of the actual object of interest, various shapes, or other labels or annotations associated with the actual object of interest. The determined or received position and orientation data of the actual object of interest may be compared with the coarse labels in order to correct various errors associated with the received data, e.g., including positioning errors, timing errors, or other errors. Further, a control system and/or a vehicle control system may receive the coarse label of the real object for error correction.

The process 500 may proceed to overlay the three-dimensional model of the object onto the real object within imaging data based on the position and orientation data of the camera and real object, as at 512. For example, the three-dimensional model may be positioned and oriented, e.g., rotated in various directions, based on the received position and orientation data of the real object, as well as the position and orientation data of the imaging device. In addition, the three-dimensional model may be positioned, rendered, or overlaid on the imaging data based on the relative position and orientation data of the imaging device and the real object. Furthermore, the three-dimensional model may be rendered with a size, shape, and/or other visual features based on the relative position and orientation data of the imaging device and the real object, e.g., to simulate and substantially match or correspond to the position and orientation of the actual object represented within the imaging data. Further, a control system and/or a vehicle control system may render and overlay the three-dimensional model onto the real object within imaging data.

The process 500 may then continue with generating a mask associated with the three-dimensional model of the object overlaid onto the real object within the imaging data, as at 514. For example, a mask or silhouette associated with the three-dimensional model of the actual object may be extracted or generated from the imaging data. The mask or silhouette may comprise a boundary, periphery, outline, curve, edge, surface, area, or other indication including, enclosing, encompassing, or otherwise indicating one or more pixels associated with the actual object of interest represented within the imaging data. As a result, the mask or silhouette may comprise a label or annotation associated with one or more pixels of the actual object of interest that may be used as training data for one or more machine learning models. Further, a control system and/or a vehicle control system may generate a mask associated with the three-dimensional model of the object overlaid onto the real object within the imaging data.

The process 500 may then proceed with providing the imaging data and the mask to a machine learning model, as at 516. For example, the imaging data including a representation of an actual object of interest may be provided as training inputs to one or more machine learning models, and the mask or silhouette indicating one or more pixels of the actual object may be provided as training outputs to one or more machine learning models. Thus, the automatically generated masks or silhouettes may be utilized as training data for one or more machine learning models to facilitate performance of various processes or tasks, e.g., detection, identification, classification, recognition, tracking, instance segmentation, determination of potential collisions or interferences, or other processes or tasks. Further, a control system and/or a vehicle control system may provide the imaging data and the masks as training data to one or more machine learning models.

The process 500 may then end, as at 518.

Using the systems and methods described herein, training data including masks, labels, or annotations associated with three-dimensional models and actual objects of interest may be automatically extracted or generated to facilitate semi-supervised, or unsupervised, machine learning methods in a faster, more efficient, and cost-effective manner. Further, the trained machine learning models may then facilitate performance of various processes or tasks, including detection, identification, classification, recognition, tracking, instance segmentation, determination of potential collisions or interferences, or other processes or tasks.

Figure 6:
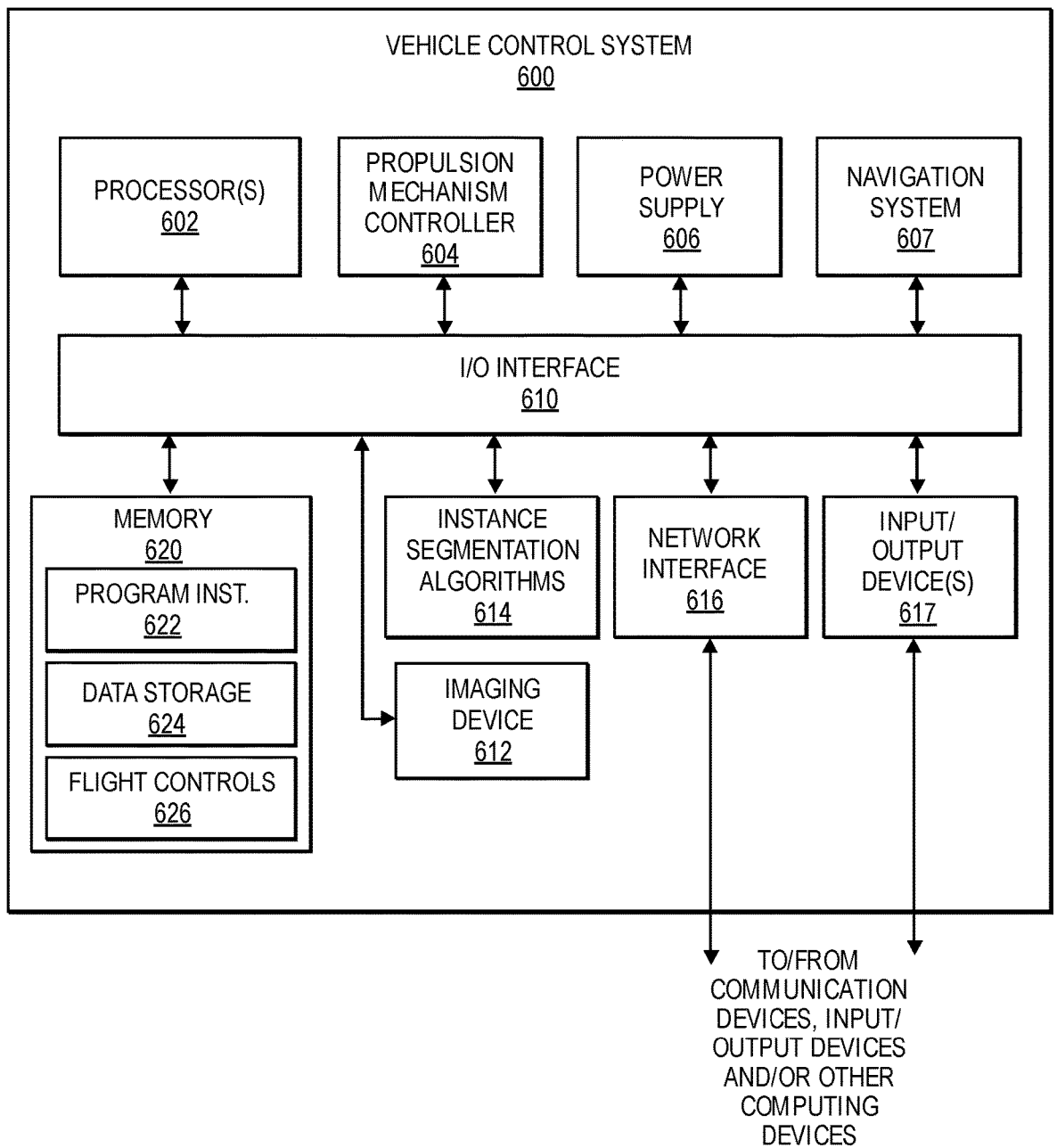
FIG. 6 is a block diagram illustrating various components of a vehicle control system, in accordance with implementations of the present disclosure.

FIG. 6 is a block diagram illustrating various components of an example vehicle control system 600, in accordance with implementations of the present disclosure.

In various examples, the block diagram may be illustrative of one or more aspects of the vehicle control system 600 that may be used to implement the various systems and processes discussed above. In the illustrated implementation, the vehicle control system 600 includes one or more processors 602, coupled to a non-transitory computer readable storage medium 620 via an input/output (I/O) interface 610. The vehicle control system 600 may also include a propulsion mechanism controller 604, a power supply or battery 606, and/or a navigation system 607. The vehicle control system 600 may further include an imaging device 612 and one or more instance segmentation algorithms 614, a network interface 616, and one or more input/output devices 617.

In various implementations, the vehicle control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, flight or navigation data, and various data associated with the vehicle, imaging device, imaging data, and/or objects of interest, including vehicle data, vehicle position and orientation data, imaging device data, imaging device position and orientation data, imaging data, object attribute data, object tracking data, object position and orientation data, three-dimensional models of objects, mask or silhouette data, and/or other data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and flight controls 626, respectively. In other implementations, program instructions, flight data and/or other data may be received, sent or stored upon different types of computer-accessible media, such as non-transitory media, or on similar media separate from the non-transitory computer readable storage medium 620 or the vehicle control system 600.

Generally, a non-transitory, computer readable storage medium may include storage media or memory media such as magnetic or optical media, e.g., disk or CD/DVD-ROM, coupled to the vehicle control system 600 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 617. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propulsion mechanism controller 604 communicates with the navigation system 607 and adjusts the operational characteristics of each propulsion mechanism to guide the vehicle along a determined path and/or to perform other navigational maneuvers. The navigation system 607 may include an inertial measurement unit, accelerometer, gyroscope, GPS or other similar system than can be used to navigate the vehicle to and/or from a location.

The vehicle control system 600 may also include an imaging device 612. The imaging device 612 may comprise various types of imaging devices, cameras, or sensors, such as an RGB camera, stereo 3D camera, depth sensor, or other types of imaging sensors or devices. The imaging device 612 may be coupled to the vehicle and may capture imaging data at various positions and orientations of the vehicle and/or imaging device. Further, the imaging data may be transferred, stored, or processed to facilitate performance of various processes or tasks, including detection, identification, classification, recognition, tracking, instance segmentation, determination of potential collisions or interferences, or other processes or tasks, as further described herein.

The vehicle control system 600 may also include instance segmentation algorithms 614. For example, the instance segmentation algorithms may comprise machine learning models, deep learning models, neural networks, or other types of machine learning models. In some example embodiments, the instance segmentation algorithms may comprise machine learning models that have been trained to detect and identify objects of interest within imaging data, e.g., based on imaging data captured and processed at least partially by the vehicle control system 600, as further described herein. In addition, the instance segmentation algorithms may facilitate determinations or calculations of times to closest points of approach for one or more objects of interest relative to the vehicle and imaging device. Based on outputs from the instance segmentation algorithms, the vehicle control system 600 may instruct various changes or modifications to flight, navigation, or other operations of the vehicle, to avoid potential collisions or interferences.

The network interface 616 may be configured to allow data to be exchanged between the vehicle control system 600, other devices attached to a network, such as other computer systems, control systems, imaging sensors, and/or control systems of other vehicles, systems, or devices. For example, the network interface 616 may enable wireless communication between numerous vehicles. In various implementations, the network interface 616 may support communication via wireless general data networks, such as a Wi-Fi network. For example, the network interface 616 may support communication via telecommunications networks such as cellular communication networks, satellite networks, and the like.

Input/output devices 617 may, in some implementations, include one or more displays, imaging sensors, image capture devices, thermal sensors, infrared sensors, time of flight sensors, inertial measurement units, accelerometers, gyroscopes, pressure sensors, weather sensors, various other sensors described herein, etc. Multiple input/output devices 617 may be present and controlled by the vehicle control system 600. One or more of these sensors may be utilized to assist in performing the various functions, operations, and processes described herein.

As shown in FIG. 6, the memory may include program instructions 622 which may be configured to implement the example processes and/or sub-processes described above. The data storage 624 may include various data stores for maintaining data items that may be provided for performing the various functions, operations, and processes described herein. For example, the data storage 624 may include various data associated with the vehicle, imaging device, imaging data, and/or objects of interest, including vehicle data, vehicle position and orientation data, imaging device data, imaging device position and orientation data, imaging data, object attribute data, object tracking data, object position and orientation data, three-dimensional models of objects, mask or silhouette data, and/or other data items.

Those skilled in the art will appreciate that the vehicle control system 600 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The vehicle control system 600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While some of the above examples have been described with respect to aerial vehicles, the disclosed implementations may also be used for other forms of vehicles, including, but not limited to, ground based vehicles and water based vehicles.

Figure 7:
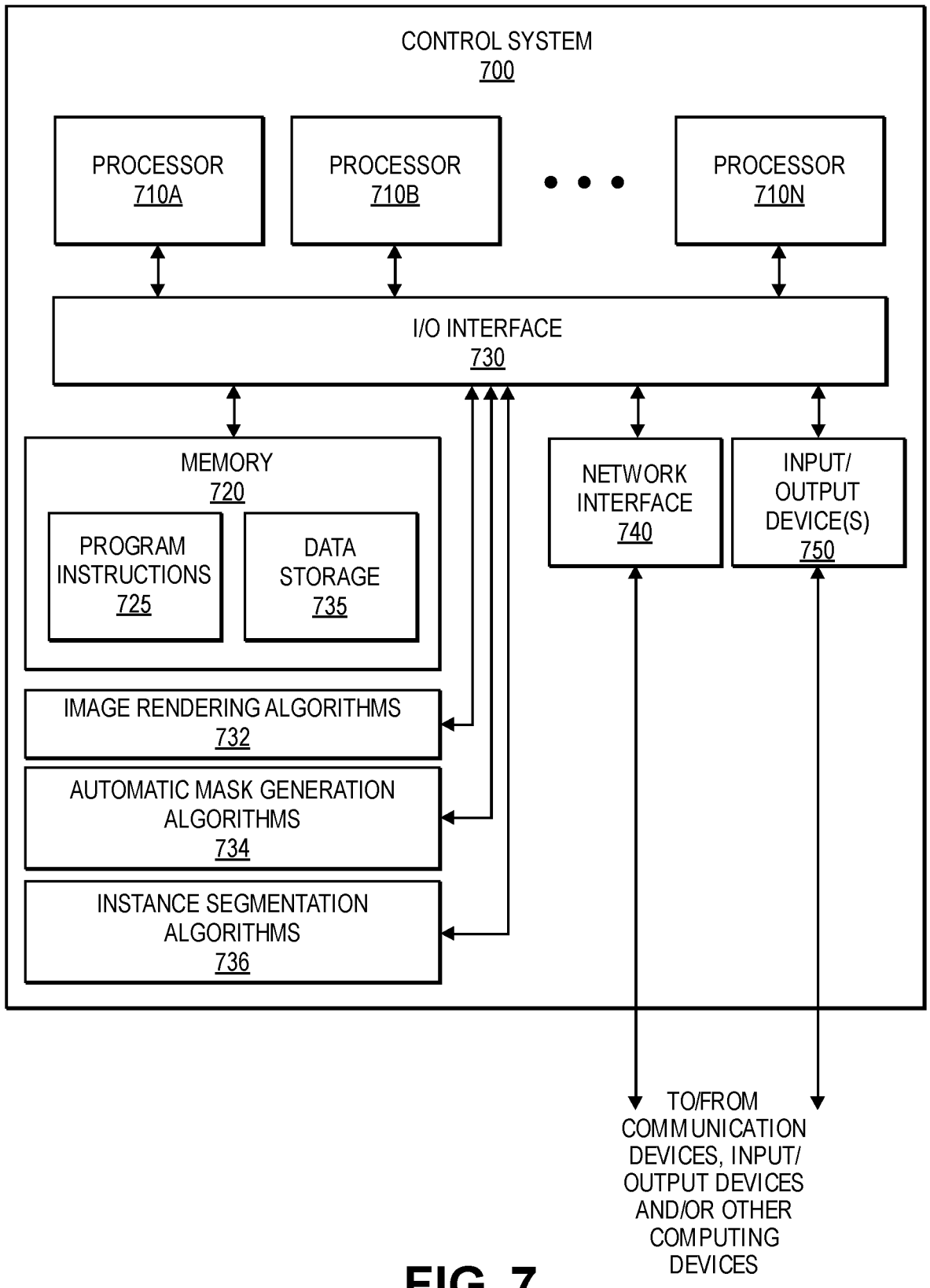
FIG. 7 is a block diagram illustrating various components of a control system, in accordance with implementations of the present disclosure.

FIG. 7 is a block diagram illustrating various components of an example control system 700, in accordance with implementations of the present disclosure.

Various operations of a control system or controller, such as those described herein, may be executed on one or more computer systems, and/or interacting with various other computers, systems, or devices, according to various implementations. For example, the control system or controller discussed above may function and operate on one or more computer systems. One such control system is illustrated by the block diagram in FIG. 7. In the illustrated implementation, a control system 700 includes one or more processors 710A, 710B through 710N, coupled to a non-transitory computer-readable storage medium 720 via an input/output (I/O) interface 730. The control system 700 further includes a network interface 740 coupled to the I/O interface 730, and one or more input/output devices 750. In some implementations, it is contemplated that a described implementation may be implemented using a single instance of the control system 700 while, in other implementations, multiple such systems or multiple nodes making up the control system 700 may be configured to host different portions or instances of the described implementations. For example, in one implementation, some data sources or services (e.g., related to portions of automatic training data generation systems, operations, or processes, etc.) may be implemented via one or more nodes of the control system 700 that are distinct from those nodes implementing other data sources or services (e.g., related to other portions of automatic training data generation systems, operations, or processes, etc.).

In various implementations, the control system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the control system 700. Generally speaking, a non-transitory, computer-readable storage medium may include storage media or memory media such as magnetic or optical media, e.g., disk or CD/DVD-ROM, coupled to the control system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the control system 700 and other devices attached to a network, such as other control systems, vehicle control systems, image capture systems, image processing systems (which may include machine learning models, algorithms, or techniques), other computer systems, various types of sensors, various types of vision systems, imaging devices, or imaging sensors, or between nodes of the control system 700. In various implementations, the network interface 740 may support communication via wired or wireless general data networks, such as any suitable type of Ethernet network.

Input/output devices 750 may, in some implementations, include one or more displays, projection devices, scanning devices, imaging devices, sensors, other visual input/output devices, microphones, speakers, other audio input/output devices, keyboards, keypads, touchpads, photo eyes, proximity sensors, RFID readers, voice or optical recognition devices, or any other devices suitable for entering or retrieving data by one or more control systems 700. Multiple input/output devices 750 may be present in the control system 700 or may be distributed on various nodes of the control system 700. In some implementations, similar input/output devices may be separate from the control system 700 and may interact with one or more nodes of the control system 700 through a wired or wireless connection, such as over the network interface 740.

As shown in FIG. 7, the memory 720 may include program instructions 725 that may be configured to implement one or more of the described implementations and/or provide data storage 735, which may comprise various tables, data stores and/or other data structures accessible by the program instructions 725. The program instructions 725 may include various executable instructions, programs, or applications to facilitate various operations and processes described herein, such as vehicle controllers, drivers, or applications, imaging device controllers, drivers, or applications, imaging data processing controllers, drivers, or applications, computer graphics controllers, drivers, or applications, automatic mask generation controllers, drivers, or applications, machine learning model controllers, drivers, or applications, etc. The data storage 735 may include various data stores for maintaining data related to systems, operations, or processes described herein, such as various data associated with the vehicle, imaging device, imaging data, and/or objects of interest, including vehicle data, vehicle position and orientation data, imaging device data, imaging device position and orientation data, imaging data, object attribute data, object tracking data, object position and orientation data, three-dimensional models of objects, mask or silhouette data, etc.

The control system 700 may also include image rendering algorithms 732. For example, the image rendering algorithms may comprise various types of computer graphics applications or algorithms to render and overlay three-dimensional models of synthetic or real-world objects onto imaging data. In addition, the image rendering algorithms may position and orient three-dimensional models of synthetic objects onto imaging data at selected positions and orientations, and/or may position and orient three-dimensional models of objects onto real-world objects within imaging data, as further described herein.

The control system 700 may also include automatic mask generation algorithms 734. For example, the automatic mask generation algorithms may comprise various computer graphics applications or algorithms to extract or generate masks or silhouettes associated with three-dimensional models of objects overlaid onto imaging data. The masks or silhouettes may be extracted or generated from a perspective, or position and orientation, of the imaging device that captured the imaging data. In addition, the masks and silhouettes may comprise boundaries, peripheries, outlines, curves, edges, surfaces, areas, or other indications including, enclosing, encompassing, or otherwise indicating one or more pixels associated with the three-dimensional models and/or real-world objects represented within imaging data, as further described herein.

The control system 700 may also include instance segmentation algorithms 736. For example, the instance segmentation algorithms may comprise machine learning models, deep learning models, neural networks, or other types of machine learning models. In some example embodiments, the instance segmentation algorithms may comprise machine learning models configured to be trained to detect and identify objects of interest within imaging data, e.g., using imaging data as training inputs and automatically generated masks and associated pixels as training outputs, as further described herein. As one example, the instance segmentation algorithms may facilitate determinations or calculations of times to closest points of approach for one or more objects of interest relative to the vehicle and imaging device. The trained instance segmentation algorithms may be provided to one or more other control systems, e.g., a vehicle control system 600 as described with respect to FIG. 6, to perform instance segmentation during various associated operations or processes.

Those skilled in the art will appreciate that the control system 700 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3 and 5, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to automatically generate training data, comprising:
   receiving, by a controller from an imaging device associated with an aerial vehicle, imaging data;
   receiving, by the controller, position and orientation data associated with the imaging device;
   receiving, by the controller, position and orientation data associated with an airborne object represented within the imaging data;
   receiving, by the controller, attribute data associated with the airborne object;
   receiving, by the controller, a three-dimensional model corresponding to the airborne object based on the attribute data;
   rendering, by the controller, the three-dimensional model overlaying the airborne object represented within the imaging data based on the position and orientation data of the imaging device and the position and orientation data of the airborne object;
   generating, by the controller, a mask based on the three-dimensional model overlaying the airborne object; and
   providing, by the controller, the imaging data and the mask to a machine learning model as training data.

2. The method of claim 1, wherein the position and orientation data associated with the imaging device is received from an inertial measurement unit associated with the aerial vehicle.

3. The method of claim 1, wherein the position and orientation data associated with the airborne object represented within the imaging data is received from an inertial measurement unit associated with the airborne object.

4. The method of claim 1, wherein the attribute data associated with the airborne object is received from the airborne object.

5. The method of claim 1, wherein rendering the three-dimensional model overlaying the airborne object represented within the imaging data further comprises:
   modifying a position and orientation of the three-dimensional model based on the position and orientation data of the airborne object; and
   rendering the modified three-dimensional model within the imaging data based on the position and orientation data of the imaging device.

6. A method, comprising:
   receiving, by a controller from an imaging device, imaging data;
   receiving, by the controller, position and orientation data associated with the imaging device;
   determining, by the controller, position and orientation data associated with an object of interest;
   receiving, by the controller, a three-dimensional model associated with the object of interest;
   rendering, by the controller, the three-dimensional model overlaying the imaging data based on the position and orientation data of the imaging device and the position and orientation data of the object of interest;
   generating, by the controller, a mask based on the three-dimensional model overlaying the imaging data; and
   providing, by the controller, the imaging data and the mask to a machine learning model as training data.

7. The method of claim 6, wherein the object of interest comprises a synthetic object to be overlaid on the imaging data.

8. The method of claim 7, wherein rendering the three-dimensional model overlaying the imaging data further comprises:

modifying a position and orientation of the three-dimensional model based on the position and orientation data of the object of interest; and rendering the modified three-dimensional model within the imaging data based on the position and orientation data and image capture characteristics of the imaging device.

9. The method of claim 6, wherein the imaging device is associated with a vehicle comprising at least one of an airborne vehicle, a ground-based vehicle, or a water-based vehicle; and wherein the position and orientation data associated with the imaging device is received from an inertial measurement unit associated with the vehicle.

10. The method of claim 6, wherein the object of interest comprises a real object represented within the imaging data.

11. The method of claim 10, wherein the position and orientation data associated with the object of interest is received from an inertial measurement unit associated with the real object represented within the imaging data.

12. The method of claim 11, further comprising:

receiving, by the controller, attribute data associated with the real object represented within the imaging data;

wherein receiving the three-dimensional model associated with the object of interest comprises receiving the three-dimensional model corresponding to the real object represented within the imaging data based on the attribute data.

13. The method of claim 12, wherein the position and orientation data comprises only position data of the real object; and the method further comprising:

estimating the orientation data of the real object based on the position data and the attribute data of the real object.

14. The method of claim 12, wherein rendering the three-dimensional model overlaying the imaging data further comprises:

modifying a position and orientation of the three-dimensional model based on the position and orientation data of the object of interest; and rendering the modified three-dimensional model overlaying the real object represented within the imaging data based on the position and orientation data of the imaging device.

15. The method of claim 14, further comprising:

receiving, by the controller, a coarse label associated with the real object;

wherein the position and orientation of the three-dimensional model is further modified based on a comparison between the position and orientation data of the object of interest and the coarse label.

16. The method of claim 6, wherein the mask comprises at least one of a boundary, periphery, outline, curve, edge, surface, or area including a plurality of pixels associated with the object of interest.

* * * * *